(12) United States Patent
Rubinstein et al.

(10) Patent No.: US 9,189,549 B2
(45) Date of Patent: Nov. 17, 2015

(54) PRESENTING ACTIONS AND PROVIDERS ASSOCIATED WITH ENTITIES

(75) Inventors: Benjamin Rubinstein, Mountain View, CA (US); Ashok K. Chandra, Saratoga, CA (US); Olivier Jerzy Dabrowski, Gilroy, CA (US); David James Gemmell, Danville, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 12/941,315

(22) Filed: Nov. 8, 2010

(65) Prior Publication Data

US 2012/0117058 A1 May 10, 2012

(51) Int. Cl.
*G06F 17/30* (2006.01)
*G06Q 30/06* (2012.01)

(52) U.S. Cl.
CPC ...... *G06F 17/30864* (2013.01); *G06Q 30/0601* (2013.01)

(58) Field of Classification Search
CPC .............. G06Q 30/0601; G06Q 10/02; G06F 17/30864
USPC ......... 707/706, 708, 728, 731, 770, 718, 723, 707/999.003, E17.066; 705/6, 26.2
See application file for complete search history.

(56) References Cited

U.S. PATENT DOCUMENTS

| | | | |
|---|---|---|---|
| 5,948,040 A * | 9/1999 | DeLorme et al. ............. 701/426 |
| 7,669,142 B2 | 2/2010 | Ray et al. |
| 7,698,327 B2 | 4/2010 | Kapur |
| 7,877,280 B2 * | 1/2011 | Jones et al. ........................ 705/6 |
| 8,073,830 B2 | 12/2011 | Fontes et al. |
| 8,839,140 B2 | 9/2014 | Nassar |
| 2004/0243549 A1 * | 12/2004 | Richartz et al. ................... 707/3 |
| 2006/0085280 A1 | 4/2006 | Murnan et al. |
| 2007/0100650 A1 | 5/2007 | Ramer et al. |
| 2007/0130124 A1 | 6/2007 | Ramsey et al. |
| 2007/0185844 A1 | 8/2007 | Schachter |
| 2007/0204232 A1 | 8/2007 | Ray |
| 2007/0294240 A1 | 12/2007 | Steele |
| 2008/0005076 A1 | 1/2008 | Payne et al. |
| 2009/0254544 A1 * | 10/2009 | Crosby et al. ..................... 707/5 |
| 2009/0292461 A1 * | 11/2009 | Mastie et al. ................. 701/201 |
| 2009/0307205 A1 | 12/2009 | Churchill et al. |
| 2009/0313055 A1 * | 12/2009 | Martin et al. ..................... 705/6 |

(Continued)

OTHER PUBLICATIONS

Xiaoxin Yin et al., "Building Taxonomy of Web Search Intents for Name Entity Queries," ACM, WWW 2010, Apr. 26-30, 2010, Raleigh, North Carolina, 10 pp.

(Continued)

*Primary Examiner* — Md. I Uddin
(74) *Attorney, Agent, or Firm* — Jessica Myers; Jim Ross; Micky Minhas

(57) ABSTRACT

Computer-readable media, computer systems, and computing devices method of facilitating presentation of actions and providers associated with entities. The method includes determining a query intent of a received query. Entity sets having an entity that matches the determined query intent are recognized. Each entity set includes an entity, an action, and a provider. Actions and/or providers associated with the entity that matches the determined query intent are identified. The actions and/or the corresponding providers associated with the entity are provided for integration with a representation of the associated entity on a search results page.

18 Claims, 10 Drawing Sheets

(56) References Cited

U.S. PATENT DOCUMENTS

2010/0082398 A1    4/2010  Davis et al.
2010/0312764 A1*  12/2010  Liao et al. .................... 707/723

OTHER PUBLICATIONS

Raju Vegesna, Introducing Zoho 'Actionable' Search, Jun. 1, 2010, published Jan. 1, 2010, http://blogs.zoho.com/general/introducing-zoho-actionalble-search, 9 pp.

"Searching for Virtue—Virtuous Cycles as a Model for Successful Search Implementations," published Sep. 14, 2009, Microsoft Enterprise Search Blog, http://sharepointsearch.com/cs/blogs/enterprisesearch/default.aspx?PageIndex=2, 30 pp.

Jiafeng Guo et al, "Named Entity Recognition in Query," published Jul. 19, 2009, ACM, SIGIR '09, Jul. 19-23, 2009, Boston, Mass, 8 pp.

PCT International Search Report, mailed Apr. 10, 2012, 9 pp.

"Third Office Action Issued in Chinese Patent Application No. 201110462144.5", Mailed Date: Apr. 8, 2015, 6 Pages.

Chinese Search Report dated Feb. 8, 2014 in Application No. 201110462144.5, 7 pages.

Chinese Office Action dated Sep. 25, 2014 in Application No. 201110462144.5, 11 pages.

* cited by examiner

| ENTITY (312) | ACTION (314) | PROVIDER (316) |
|---|---|---|
| BOOKS, CAMERAS | BUY | ONLINE RETAILER A |
| CAMERA | BUY | ONLINE RETAILER B |
| MOVIE TICKET | BUY | ONLINE RETAILER C |
| PIZZA | ORDER | RESTAURANT A |
| DVD | RENT | RENTAL SITE A |
| DVD | STREAM | RENTAL SITE A |
| RESTAURANT | RECOMMEND | REVIEW SITE A |
| STORY | SHARE | SOCIAL NETWORKING SITE A |
| SONG | PLAY | MUSIC RETAILER A |
| BOARDING CARD | PRINT | AIRLINE A |

FIG. 3

PRESENTING ACTIONS AND PROVIDERS ASSOCIATED WITH ENTITIES

BACKGROUND

Many of the searches that users perform are increasingly being used to accomplish tasks, such as, for example, making a dinner reservation, viewing an online movie, buying a book, booking a trip, etc. The traditional practice of performing a task often results in the user having to find a website that supports the task and, thereafter, find the task within the website. Search engines can assist users with finding a website(s) to perform a task. Upon navigating to the website, however, the user still must navigate the website (which has a user interface that is different from other websites) and/or re-enter information previously entered into the search query to complete the desired task. Further, because many tasks can be performed in association with various entities (e.g., people, places, and things) and various providers, the user may spend an unnecessary amount of time finding desired information and may be required to do a fair amount of guess-work to determine where to obtain the information. This results in a poor user experience, longer task-completion time, and less successful search sessions.

SUMMARY

This Summary is provided to introduce a selection of concepts in a simplified form that are further described below in the Detailed Description. This Summary is not intended to identify key features or essential features of the claimed subject matter, nor is it intended to be used in isolation as an aid in determining the scope of the claimed subject matter.

According to embodiments of the invention, a search results page generally includes search result items (e.g., search results, instant answers, etc) that can represent entities—people, places, or things. Actions (e.g., a task) to be performed and/or providers used to execute such actions that are associated with a particular entity can be displayed in a proximity relative to a search result item that represents the particular entity. In this regard, a user can initiate performance of a desired action by a provider directly from a search results page. Actions and/or providers selected for display in association with a search result item can be determined, for example, using an offline ranking(s), an online ranking(s), a query log(s), a search result item(s) identified in response to a search query, a user interest(s), combination thereof, or the like.

BRIEF DESCRIPTION OF THE DRAWINGS

Embodiments of the invention are described in detail below with reference to the attached drawing figures, wherein:

FIG. 3 provides an exemplary illustration of a plurality of entity sets, in accordance with embodiments of the invention;

DETAILED DESCRIPTION

Figure 1:
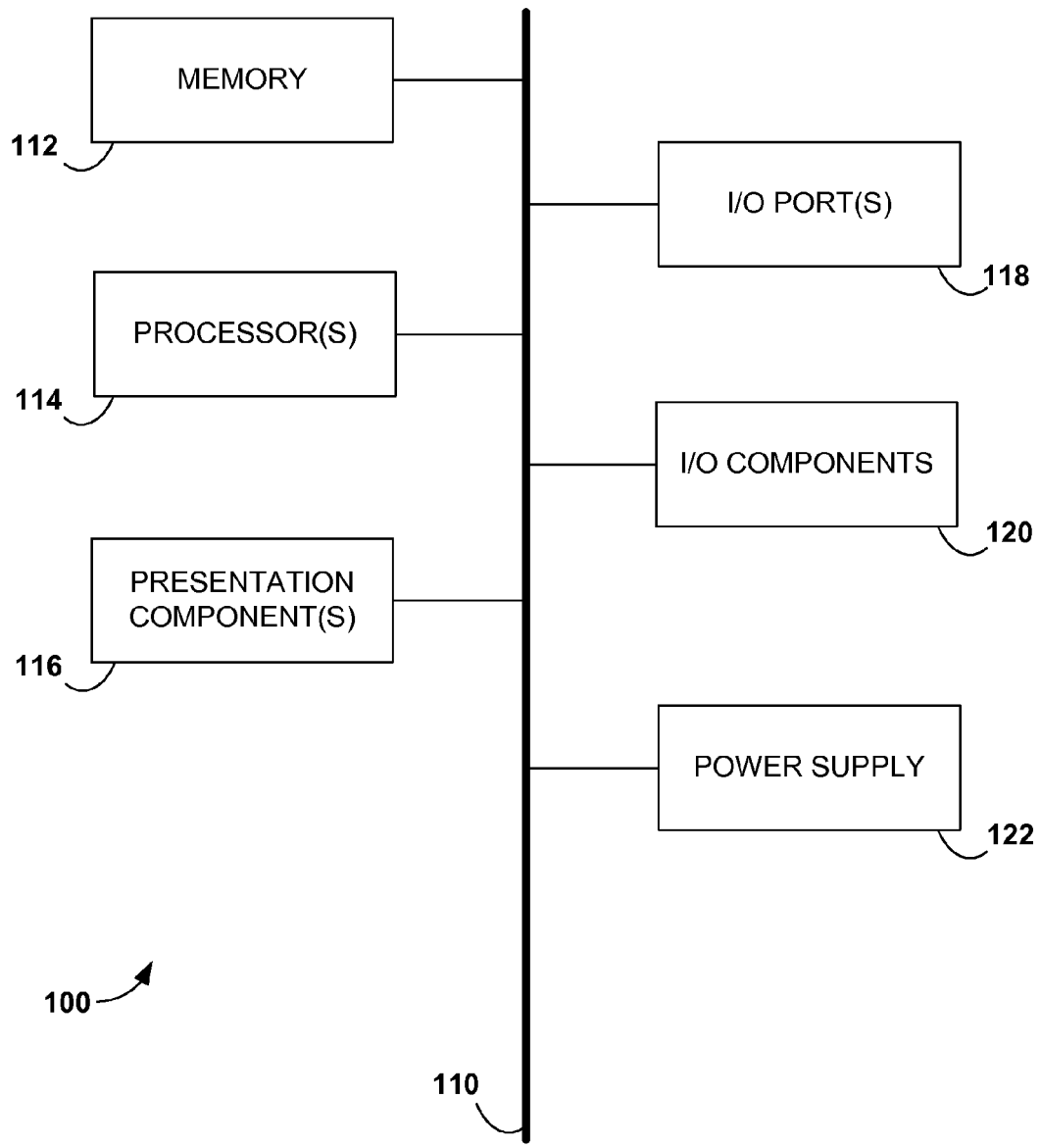
FIG. 1 is a block diagram of an exemplary computing device suitable for implementing embodiments of the invention.

The subject matter of embodiments of the invention disclosed herein is described with specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the invention described herein include computer-readable media having computer-executable instructions for performing a method of facilitating presentation of actions and providers associated with entities. The method includes referencing entity sets. Each entity set includes an entity that represents a person, a place, or a thing, an action that corresponds with the entity and that represents a function to perform, and a provider that executes the corresponding action. A query log(s) is utilized to rank the entities, the actions, and/or the providers of the entity sets in accordance with an expected relevance. Thereafter, the entity sets, including the corresponding entities, actions, and providers, and the corresponding rankings are input into a database.

In a second illustrative embodiment, computer-executable instructions cause a computing device to perform a method of facilitating presentation of actions and providers associated with entities. The method includes determining a query intent of a received query. Entity sets having an entity that matches the determined query intent are identified. Each entity set includes an entity, an action corresponding with the entity, and a provider. Actions associated with the entity that matches the determined query intent are identified, and providers associated with the identified actions are identified. The actions and the corresponding providers associated with the entity are provided for integration with a representation of the associated entity on a search results page.

In a third illustrative embodiment, a graphical user interface embodied on one or more computer-readable media and executable on a computer is provided. The graphical user interface includes a first display area configured for displaying a search result item presented on a search results page. The search result item corresponds with a received search query. The graphical user interface also includes a second display area positioned near the first display area. The second display area is configured for displaying a set of actions that correspond with an entity represented by the search result item and a set of providers associated with each of the actions. Each of the sets of providers is positioned near the corresponding action.

Various aspects of embodiments of the invention may be described in the general context of computer program products that include computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. Embodiments of the invention may be practiced in a variety of system configurations, including dedicated servers, general-purpose computers, laptops, more specialty computing devices, and the like. The invention may also be practiced in distributed computing environments where tasks are performed by remote-processing devices that are linked through a communications network.

Computer-readable media include both volatile and nonvolatile media, removable and nonremovable media, and contemplate media readable by a database, a processor, and various other networked computing devices. By way of example, and not limitation, computer-readable media include media implemented in any method or technology for storing information. Examples of stored information include computer-executable instructions, data structures, program modules, and other data representations. Media examples include, but are not limited to RAM, ROM, EEPROM, flash memory and other memory technology, CD-ROM, digital versatile discs (DVD), holographic media and other optical disc storage, magnetic cassettes, magnetic tape, magnetic disk storage, and other magnetic storage devices. These technologies can store data momentarily, temporarily, or permanently.

An exemplary operating environment in which various aspects of the present invention may be implemented is described below in order to provide a general context for various aspects of the present invention. Referring initially to FIG. 1, an exemplary operating environment for implementing embodiments of the present invention is shown and designated generally as computing device 100. The computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The computing device 100 includes a bus 110 that directly or indirectly couples the following devices: a memory 112, one or more processors 114, one or more presentation components 116, input/output (I/O) ports 118, input/output components 120, and an illustrative power supply 122. The bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be gray and fuzzy. For example, one may consider a presentation component such as a display device to be an I/O component. Also, processors have memory. The inventors recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

The memory 112 includes computer-executable instructions (not shown) stored in volatile and/or nonvolatile memory. The memory may be removable, nonremovable, or a combination thereof. Exemplary hardware devices include solid-state memory, hard drives, optical-disc drives, etc. The computing device 100 includes one or more processors 114 coupled with a system bus 110 that read data from various entities such as the memory 112 or I/O components 120. In an embodiment, the one or more processors 114 execute the computer-executable instructions to perform various tasks and methods defined by the computer-executable instructions. The presentation component(s) 116 are coupled to the system bus 110 and present data indications to a user or other device. Exemplary presentation components 116 include a display device, speaker, printing component, and the like.

The I/O ports 118 allow computing device 100 to be logically coupled to other devices including the I/O components 120, some of which may be built in. Illustrative components include a microphone, joystick, game pad, satellite dish, scanner, printer, wireless device, keyboard, pen, voice input device, touch-input device, touch-screen device, interactive display device, or a mouse. The I/O components 120 can also include communication connections that can facilitate communicatively connecting the computing device 100 to remote devices such as, for example, other computing devices, servers, routers, and the like.

Embodiments of the present invention are directed to providing relevant actions and/or providers in association with entities, for example, represented on a search results page. Accordingly, embodiments of the present invention facilitate providing actions and/or providers that are relevant to an entity, a search result, a search query, etc. An entity represents any person, place, or thing (e.g., movie, book, restaurant, game, television show, hotel, flight status, event, shopping, travel, stock, etc.). An action, as used herein, refers to any indication of an action(s), a task(s), or a transaction(s) that can be performed, for example, via a network (e.g., the Internet). An action can be performed, for instance, upon selection of the action, or an entity or provider in association therewith. As can be appreciated, in some embodiments, performance of an action may be performance of a single task or activity. Alternatively, performance of an action may be performance of multiple, discrete tasks or activities. Generally, a provider executes, initiates, or implements an action(s), or coordinates execution, initiation, or implementation thereof. In this regard, a provider is a company or other service provider (e.g., individual) that executes, initiates, or implements an action desired by a user. In cases that an action includes multiple, discrete tasks or activities, such tasks or activities may, for example, be carried out by unrelated providers. Providers may be presented so that a user can identify a provider of a particular action or so that a user can select a particular provider to perform a particular action.

In this regard, when a search results page is displayed to a user in response to a user query, embodiments of the present invention enable a relevant action(s) (i.e., an action associated with an entity) and/or provider(s) (i.e., a provider corresponding with the action) to be provided therein in association with a particular entity. Accordingly, an action and/or provider may be provided in association with a search result item, such as a search result, an instant answer, an advertisement, etc. presented on a search results page that is associated with a particular entity. As discussed more fully below, an action and/or provider may be automatically (i.e., without user intervention) presented near a corresponding entity representation or may be presented near a corresponding entity representation upon a user indication (e.g., hover selector over entity, select entity, selection action, etc.).

As can be appreciated, an entity can be represented on a search results page by an independent representation of the entity or by a search result item. Such a search result item may refer to, for example, a search result or an instant answer. A search result refers to a result that is presented as relevant to a user search query. Typically, a search result includes a website link and a snippet that summarizes content of the website. A user may select a website link of a search result to navigate to the webpage related to the user search query. For example, assume a user search query is "weather in Seattle." An algorithm result within a search results page might include a URL to weather.com. In such a case, the user can select the URL, transfer to that webpage, and, thereafter, input Seattle to obtain the weather in Seattle.

An "instant answer" (referred to herein, interchangeably, as an "answer") refers to a result that is a response or answer to a search query that is provided to a user on the main search results page. That is, a user is presented with domain-specific content on the search results page in response to a query, whereas the user might otherwise be required to select a link within the search results page to navigate to another webpage and, thereafter, search further for the desired information. For example, assume a user search query is "weather in Seattle." An "answer" presented on the search results page contains the weather for Seattle such that a user is not required to navigate to another webpage to find the answer to the intended query. As can be appreciated, an answer might pertain to any subject matter including, for example, weather, news, area codes, conversions, dictionary terms, encyclopedia entries, finance, flights, health, holidays, dates, hotels, local listings, math, movies, music, shopping, sports, package tracking, and the like. An answer can be in the form of an icon, a button, a link, text, a video, an image, a photograph, an audio, a combination thereof, or the like.

The term "query" refers to any type of request containing one or more search terms that can be submitted to a search engine (or multiple search engines) for identifying search result items based on the search term(s) contained in the query. The search result items that are identified by the queries in the data structure are representations of results produced in response to the queries. For example, the search result items can be search results, instant answers, advertisements, etc.

Figure 4:
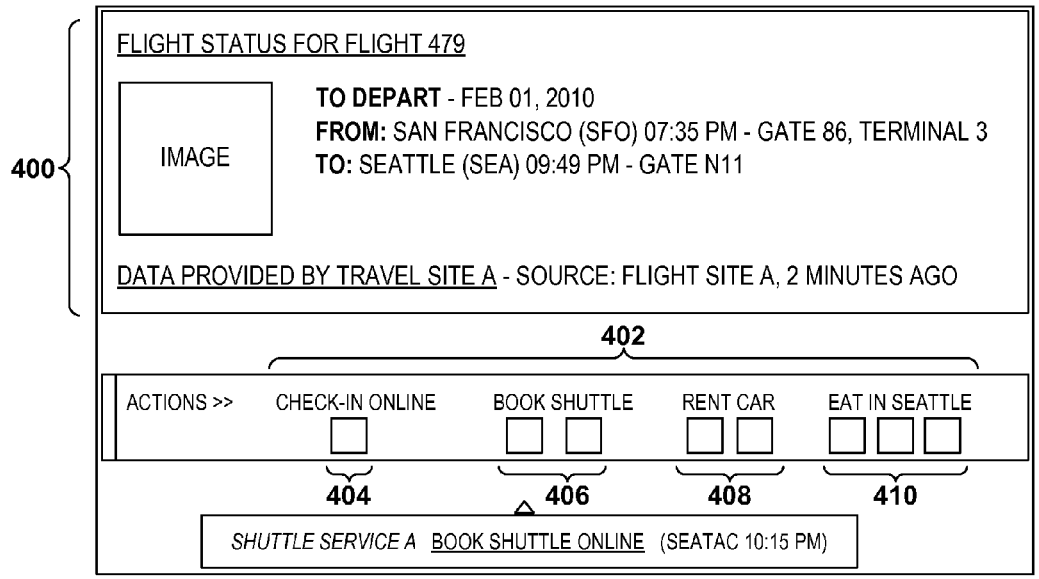
FIG. 4 is a schematic diagram depicting a first illustrative display of a search result item and corresponding actions and providers, in accordance with embodiments of the invention.

By way of example and with reference to FIG. 4, FIG. 4 illustrates an exemplary instant answer 400 corresponding with an entity (e.g., flight status) that might be presented on a search results page in response to a user search query. A set of actions 402 that correspond with the entity are displayed in association with the instant answer 400. As illustrated in FIG. 4, one or more providers 404, 406, 408, and 410 are displayed near each of the corresponding actions.

Figure 2:
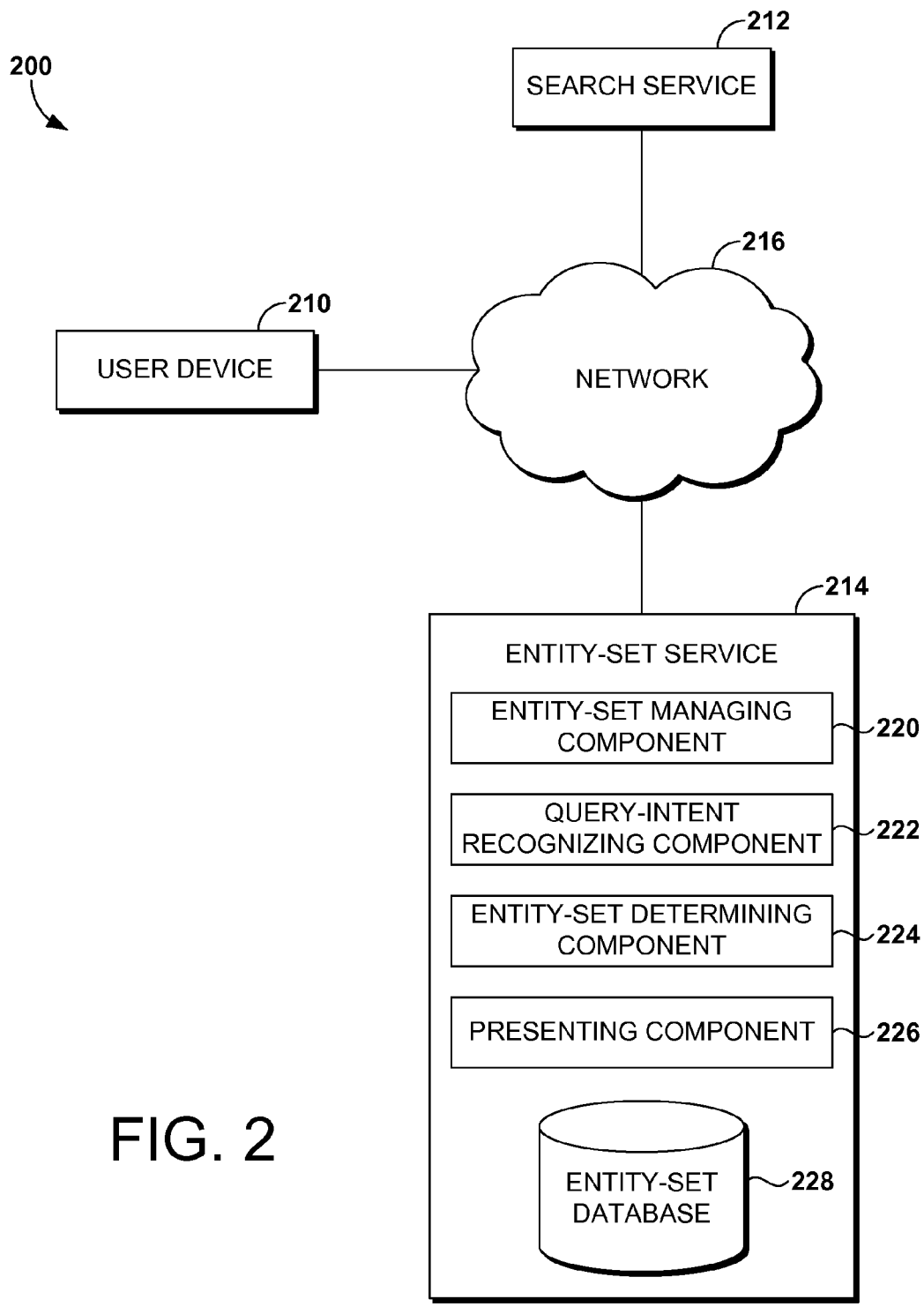
FIG. 2 is a block diagram of an exemplary network environment suitable for use in implementing embodiments of the invention.

Turning now to FIG. 2, a block diagram of an exemplary network environment 200 suitable for use in implementing embodiments of the invention is shown. The network environment 200 includes a user device 210, a search service 212, and an entity-set service 214. The user device 210, the search service 212, and the entity-set service 214 communicate through a network 216, which may include any number of networks such as, for example, a local area network (LAN), a wide area network (WAN), the Internet, a cellular network, a peer-to-peer (P2P) network, a mobile network, or a combination of networks. The network environment 200 shown in FIG. 2 is an example of one suitable network environment and is not intended to suggest any limitation as to the scope of use or functionality of embodiments of the inventions disclosed throughout this document. Neither should the exemplary network environment 200 be interpreted as having any dependency or requirement related to any single component or combination of components illustrated therein. For example, the user device 210 may be in communication with the search service 212 via a mobile network or the Internet, and the search service 212 may be in communication with entity-set service 214 via a local area network. Further, although the environment 200 is illustrated with a network, one or more of the components may directly communicate with one another, for example, via HDMI (high-definition multimedia interface), DVI (digital visual interface), etc.

The user device 210 can be any kind of computing device capable of allowing a user to submit a search query to the search service 212 and/or the entity-set service 214 and to receive, in response to the search query, a search results page including one or more actions and/or providers associated with an entity represented on a search results page. For example, in an embodiment, the user device 210 can be a computing device such as computing device 100, as described above with reference to FIG. 1. In embodiments, the user device 210 can be a personal computer (PC), a laptop computer, a workstation, a mobile computing device, a PDA, a cell phone, or the like.

In an embodiment, the user device 210 is separate and distinct from the search service 212 and/or the other components illustrated in FIG. 2. In another embodiment, the user device 210 is integrated with the search service 212 and/or entity-set service 214. For clarity of explanation, we shall describe embodiments in which the user device 210, the search service 212, and the entity-set service 214 are separate, while understanding that this may not be the case in various configurations contemplated within the present invention.

With continued reference to FIG. 2, the user device 210 communicates with the search service 212 to facilitate a search for content. In embodiments, for example, a user utilizes the user device 210 to search for content available via the network 216. For instance, in some embodiments, the network 216 might be the Internet, and the user device 210 interacts with the search service 212 to search for content stored on servers associated with websites. In other embodiments, for example, the network 216 might be an enterprise network associated with a company. In these embodiments, the user device 210 interacts with the search service 212 to search for content stored on various nodes within the enterprise network. It should be apparent to those having skill in the relevant arts that any number of other implementation scenarios may be possible as well.

The search service 212 provides searching services to users. In embodiments, the search service 212 provides searching services by searching for content in an environment in which content can be stored such as, for example, the Internet, a local area network (LAN), a wide area network (WAN), a database, a computer, or the like. The search service 212, according to embodiments, can be implemented as server systems, program modules, virtual machines, components of a server or servers, networks, and the like.

In embodiments, the search service 212 receives search queries, i.e., search requests, submitted by a user via the user device 210. Search queries received from a user can include search queries that were manually or verbally input by the user, queries that were suggested to the user and selected by the user, and any other search queries received by the search service 212 that were somehow approved by the user. In other embodiments, the search service 212 can receive search queries originating at other locations. For instance, query suggestion modules (not shown) associated with the search service 212 can provide search queries in response to user selection of query suggestions, and the like. Generally, the search service 212 can receive search queries from any number of people, locations, organizations, and devices.

The search service 212 may be or include, for example, a search engine, a crawler, or the like. The search service 212, in some embodiments, is configured to perform a search using a query submitted through the user device 210. In various embodiments, the search service 212 can provide a user interface for facilitating a search experience for a user communicating with the user device 210. In an embodiment, the search service 212 monitors searching activity, and can produce one or more records or logs representing search activity, previous queries submitted, search result items obtained, and the like. These services can be leveraged to improve the searching experience in many different ways. According to various embodiments of the invention, the search service 212 references an associated web index (not illustrated for brevity and clarity of description) to identify search result items that are relevant to a search query received from a user.

In an embodiment, the search service 212 is configured to receive a submitted query and to use the query to perform a search. In an embodiment, upon identifying search result items that satisfy the search query, the search service 212 returns a set of search result items to the user device 210 by way of a graphical interface such as a search results page. A set of search result items includes representations of content or content sites (e.g., web-pages, databases, or the like that contain content) that are deemed to be relevant to the user-defined search query. Search result items can be presented, for example, as content links, snippets, thumbnails, summaries, answers, advertisements, and the like. Content links refer to selectable representations of content or content sites that correspond to an address for the associated content. For example, a content link can be a selectable representation corresponding to a uniform resource locator (URL), IP address, or other type of address. That way, selection of a content link can result in redirection of the user's browser to the corresponding address, whereby the user can access the associated content. One commonly used example of a content link is a "hyperlink" (referred to herein, interchangeably, as an "anchor").

According to embodiments of the invention, a search results page can include a number of different types of content. For example, the search results page can include algorithmic search results, query suggestions, related searches, historical information, sponsored search results, advertisements, and instant answers. According to embodiments of the invention, the search service 212 can generate or retrieve answers, for example, from answer services (not shown), to provide an answer(s) on a search-results page.

As can be appreciated, the search service 212 may communicate with the entity-set service 214 to integrate relevant entities, actions, and/or providers with a search results page. In this regard, the entity-set service 214 may communicate data to the search service 212 for implementation of relevant entities, actions, and/or providers into a search results page. Alternatively, search service 212 may communicate a search results page, or search result items, to entity-set service 214 for incorporation of relevant entities, actions, and/or providers into the search results page. In yet another embodiment, another component, such as the user device 210, may receive data from the search service 212 and/or the entity-set service 214 and, thereafter, aggregate data to generate a search results page having relevant actions and/or providers presented in association with an entity(s) represented on a search results page.

The entity-set service 214 generally provides one or more entity sets, or portions thereof, to be displayed in association with a search results page. As previously mentioned, such entity sets, or portions thereof (e.g., entity, action, provider) may be displayed in association with a search result, an instant answer, etc. or may be displayed as an independent feature of a search results page. The entity-set service 214, in some embodiments, includes an entity-set managing component 220, a query-intent recognizing component 222, an entity-set determining component 224, and a presenting component 226. According to embodiments of the invention, the entity-set service 214 can include any number of other components not illustrated. In some embodiments, one or more of the illustrated components 220, 222, 224, and 226 can be integrated into a single component or can be divided into a number of different components. Components 220, 222, 224, and 226 can be implemented on any number of machines and can be integrated, as desired, with any number of other functionalities or services.

The entity-set managing component 220 is configured to manage entity sets. An entity set, as used herein, refers to a set of data associated with an entity. In one embodiment, an entity set includes an entity, an action corresponding with the entity, and a provider corresponding with the action and/or entity. As can be appreciated, an entity set may also include entity set attributes. An entity set attribute refers to any attribute, characteristic, or detail of an entity, action, and/or provider included within an entity set. For example, an entity set attribute may include additional details that further describe or identify an entity, an action, and/or a provider.

By way of example only, and with reference to FIG. 3, FIG. 3 includes a plurality of entity sets 310. Each of the plurality of entity sets 310 includes an entity 312, an action 314, and a provider 316. Although not illustrated, an entity set attribute may include further details describing an entity, action, and/or provider. For example, entity set 320 associated with a "movie ticket" entity may include attributes describing the cost of the ticket, the time of the movie, or the like. As can be appreciated, such entity set attributes may be included, for example, with the corresponding entity, action, and/or provider, or, alternatively, provided as another section. While FIG. 3 depicts the entity section 312 to generically describe entities (e.g., DVD), in embodiments, the entity section 312 includes a more detailed description of the entity (e.g., Avatar DVD).

Returning to FIG. 2, the entity-set managing component 220 references an entity set and, in some cases, attributes in association therewith. Entity sets can be referenced by receiving, obtaining, accessing, retrieving, determining, identifying, recognizing, or the like. In embodiments, entity sets may be provided by a vendor. For example, vendors may publish entity sets, or portions thereof, in an open format, in the form of an API, or via code or data that is scraped by crawling the web. The format can be described via APIs in XML, for example, prices for streaming or buying items, federated login information, action options such as colors for an item to be purchased, times for a reservation, locations, etc.

Upon referencing entity sets, entity matching can be performed. Such entity matching matches like or similar entities. By way of example only, multiple actions and/or providers may exist for a particular entity. In such cases, the entities may be matched or associated such that related entities are correlated, associated, or grouped together.

As can be appreciated, although multiple entities may be similar, such entities may not be matched together. For example, one entity might be the movie "Avatar" released in 2005, while another entity might be the movie "Avatar" released in 2009. Although the entities initially appear similar (i.e., each titled "Avatar"), such entities are very different from one another. Accordingly, the entity-set managing component 220 may be configured to recognize or identify entities that are actually similar or the same. In such a case, instances of the same or similar entities may be recognized across multiple actions and/or providers based on representations of the entity or attributes thereof, for example, using UPC codes, titles, manufacturers, directors, authors, locations, dates, or any other details pertaining to entities. Matching entities may utilize machine learning across multiple features to recognize how closely various attributes of two entities match. Any duplicate entity sets may be identified such that they are not included a database, such as entity-set database 228. In embodiments, entity matching may be performed so that related entities are near, approximate, or associated with each other in a database, such as entity-set database 228.

Additionally or alternatively, actions and/or providers may be matched, for example, such that related actions and/or providers associated with a particular entity are grouped together. As with entity matching, matching actions and/or providers may also be accomplished using any method, such as, for example, utilizing matching learning across multiple features to recognize how closely various attributes of two actions and/or providers match. Actions and/or providers identified as matching may be positioned near, approximate, or in association with each other in a database, such as entity-set database 228.

The one or more entity sets, or portions thereof, can be ranked, for example, via an offline ranker. As the entity sets are ranked prior to receiving a user query, such a ranking may be referred to herein as an offline rank. As can be appreciated, the entity sets, or portions thereof, can be ranked based on entity relevance, action relevance, provider relevance, or a combination thereof. By way of example only, assume various "Avatar" movies exist (e.g., a 2005 version and a 2009 version). In such a case, the "Avatar" movie entities may be ranked based on the likely relevance of the specific version of the "Avatar" movie. Accordingly, if the 2009 version is identified as having a higher perceived relevance in association with an entity, query, search result, etc., the entity(s) corresponding with the 2009 version may have a higher ranking than the 2005 version. Further, entities related to the 2009 "Avatar" movie may be ranked relative to one another based on actions and/or providers associated with the respective entities. Actions and/or providers most relevant to a particular entity are generally provided with a higher ranking. A higher rank is used herein to refer to a rank that stronger or otherwise indicates a higher priority or preference. As can be appreciated, in this way, in some cases a higher rank may actually correspond to a lower value if a lower value indicates a higher priority or preference.

By way of further example, many retailers may exist in association with a particular entity. Accordingly, ranking the providers enables particular entity sets (i.e., entity sets with a higher ranking), or portions thereof, to be selected for display in association with a search results page to prevent cluttering the search results page.

Rankings can be based on any data, such as, for example, click-through rates in query logs (e.g., music streaming might be offered first from major providers that are popular in search logs), reputation analysis of link structure on the web pertaining to actions and providers (e.g., more popular restaurants might be recommended over others), history of user(s) (e.g., search history, navigation history, query logs), a combination thereof, or the like. Additionally or alternatively, higher rankings may be granted to vendors who subscribe to the system, vendors that place a higher monetary bid, etc. In some embodiments, offline ranking of entity sets, or portions thereof, can influence the presentation of entities, actions, and/or providers in association with a search result item(s). As can be appreciated, an entity set, an entity of the entity set, an action of the entity set, and/or a provider of the entity set may be associated with a single offline ranking. Alternatively, the entity set, entity, action, and/or provider may each have an independent offline ranking.

Entity sets can be populated into a database, such as entity-set database 228, for example, via a database generator. A database generator is configured to generate, update, or modify an entity-set database. An entity-set database refers to any database, or other storage system, that includes entity sets. The entity sets can be input into the database. In embodiments, the entity sets are entered into the entity-set database in accordance with entity matching and/or entity rankings. For example, matching entity sets may be positioned or indexed near one another in an appropriate ranking order based on a corresponding ranking of the entity sets, entities, actions, and/or providers.

The query-intent recognizing component 222 is configured to recognize query intent of users. Query intent, as used herein, refers to an intent of a user in accordance with a query input by the user. That is, query intent represents data or information intended or desired to be viewed by a user. To recognize query intent, a query input by a user is referenced (e.g., received, retrieved, etc.). A past query log(s), such as a query log associated with the user that input the query, a query log of a group of users, or query logs of all users can be used to recognize query intent. Other data, such as user data, may additionally or alternatively be used to determine query intent. For example, interests of the user may be utilized to determine query intent. A query may be evaluated for the intent of the query using machine learning algorithms such as clustering. As can be appreciated, in some embodiments, query intent may be or include the query input by a user, without additional analysis.

The entity-set determining component 224 is configured to determine, identify, or select one or more entity sets, or portions thereof, to present. As previously discussed, entities, actions, and/or providers to present may be based on the offline ranking associated therewith. For example, an offline ranking can be used to select which entities, actions, and/or providers to present and/or an order in which to present such items.

In another embodiment, entities, actions, and/or providers to present may be based on an online ranking. As used herein, an online ranking refers to a ranking that is generated after a query is input. Such an online ranking can be used to identify which entities, actions, and/or providers to display and, in some cases, an appropriate order in which to display such items. For example, assume that an entity is associated with ten actions, but only five actions are desired to be presented in association with a representation of the entity. In such a case, the five actions associated with the highest rankings may be selected for presentation.

An online ranking can be determined using query intent. For instance, if query intent associated with a query corresponds with one or more entities, actions, and/or providers, for example, stored in an entity-set database, then a representation of that entity, action, and/or provider can be offered in the search results page. In some cases, an offline ranking can be modified in light of query intent to generate an online ranking. In this regard, the offline ranking can be referenced along with query intent to identify an online ranking for a query set(s), an entity(s), an action(s), and/or a provider(s). Similar to the offline ranking, an entity set, an entity of the entity set, an action of the entity set, and/or a provider of the entity set may be associated with a single online ranking. Alternatively, the entity set, entity, action, and/or provider may each have an independent offline ranking.

By way of example, assume that an entity "Avatar" is associated with 2005 version and another entity "Avatar" is associated with 2009 version. In such a case, if a user types in "Avatar" as the search query, based on the offline ranking, the 2009 "Avatar" movie may be displayed if associated with a higher relevance ranking. On the other hand, if the user search query includes "Avatar 2005," although the offline ranking may result in "Avatar" of 2009 to be displayed, the online ranking considers the query intent and, as such, a representation of the entity associated with the 2005 "Avatar" movie is displayed.

In addition or in the alternative to using query intent, search result items provided or identified in response to a user search query can be utilized to perform the online ranking. By way of example only, assume that a search query is entered and search result items (e.g., search results, instant answers, etc.) are identified. Such search result items can be used to modify the offline ranking of the entity sets, entities, actions, and/or providers to obtain an online ranking. For instance, assume a search query entered by a user is "rent Avatar 2005." Further assume that one of the top search results is associated with renting movies via the Netflix® website. In such a case, while a higher offline ranking might be associated with an entity set including buying the 2009 "Avatar" movie, based on the user intent and the search results, the online ranking might more highly rank an entity set, or portion thereof, associated with the entity 2005 "Avatar" movie, the action of renting the movie, and the Netflix® provider.

In some embodiments, offline and online rankings may be utilized to determine one or more entity sets, or portions thereof, to present in association with a search results page. For example, an online ranking may be used to identify an appropriate entity within an entity-set database, while an offline ranking may be used to identify an appropriate action and/or provider to present in association with a representation of an entity within a search results page.

The presenting component 226 is configured to present entity sets, or portions thereof (i.e., entity(s), action(s), and/or provider(s)). In one embodiment, entity sets, or portions thereof, are presented by displaying such data in association with a search results page to a user via a user interface. In another embodiment, entity sets, or portions thereof, are presented by communicating such data to another computing device. For example, such data may be communicated to a search engine such that the search engine can incorporate the data into the search results page to be transmitted to the user device. By way of further example, such data may be communicated to the user device for display to the user, via a display screen of the user device.

Entity sets, or portions thereof, can be displayed within a search results page in any number of ways. In one embodiment, upon determining, identifying, or selecting one or more entity sets to present, a representation of an entity or entities associated with such entity sets may be displayed within a search results page. Such a representation(s) can be displayed in any location on a search results page, for example, near the top portion of the results, near a side portion of the results, integrated with the results (e.g., positioned near a related search result or instant answer), etc. Actions and/or providers related to such a representation of an entity(s) can be displayed near or adjacent to such the entity(s). In an alternative embodiment, upon determining, identifying, or selecting one or more entity sets to present, actions and/or providers of the selected entity set(s) can be displayed near or adjacent to search result items (e.g., search results or instant answers) that correspond with or represent an entity(s) of the selected entity set(s).

By way of example only, FIGS. 4-9 illustrate displays of a graphical user interface for providing entity sets, or portions thereof, according to embodiments of the present invention. Such display views can be viewed, for example, via a display screen of a user device, such as user device 210. As previously mentioned, FIG. 4 illustrates an exemplary instant answer 400 corresponding with an entity (e.g., flight status) that might be presented on a search results page in response to a user search query. A set of actions 402 that correspond with the entity, or representation thereof, are displayed in association with the instant answer. As illustrated in FIG. 4, one or more providers 404, 406, 408, and 410 are displayed near each of the corresponding actions. In such a case, the set of actions and corresponding providers may be automatically displayed along with the search result items.

Figure 5:
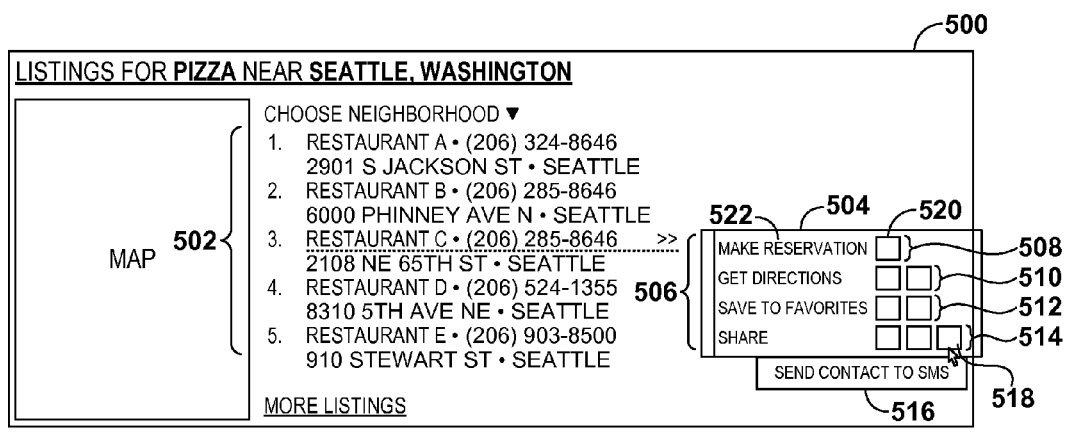
FIG. 5 is a schematic diagram depicting a second illustrative display of a search result item and corresponding actions and providers, in accordance with embodiments of the invention.

FIG. 5 illustrates a first display area 502 comprising a set of search result items presented on a search results page 500. A second display area 504 includes a set of actions 506 and, for each action, a set of one or more providers 508, 510, 512, and 514. As can be appreciated, in some embodiments, the second display area may be displayed upon a user indication, such as a selector (e.g., cursor) hovering over or selecting a search result item (e.g., "Zeeks Pizza"). Further, as illustrated in FIG. 5, additional details 516 in association with a provider may be displayed upon a user indication, such as a cursor hovering over provider 518. Although not illustrated, additional details may also be provided in association with an action upon a user indication.

Figure 6:
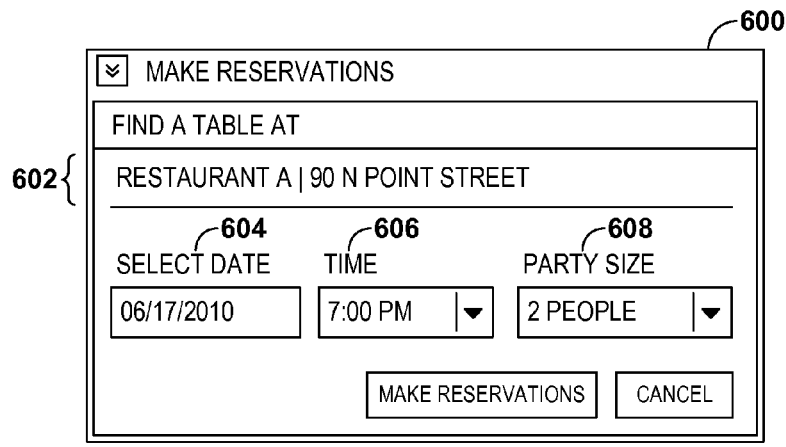
FIG. 6 is a schematic diagram depicting an illustrative display of a user interface element that facilitates action performance, in accordance with embodiments of the invention.

Assume that a user selects a provider 520 corresponding with the "Make Reservation" action 522. As illustrated in FIG. 6, a user interface element 600 may be displayed to enable a user to facilitate action performance by specifying one or more details or parameters for the action. In some cases, a summary 602 of the entity may be displayed to provide context. Form fields requesting particular data may also be displayed so that the user can select or enter data associated with the action. For example, in FIG. 6, a user may specify a date 604 for the reservation, a time 606 for the reservation, and a party size 608 for the reservation. Such an interface element facilitates completing the desired action (e.g., making a reservation) from the search results page without the need for redirection to a provider's website.

Figure 7:
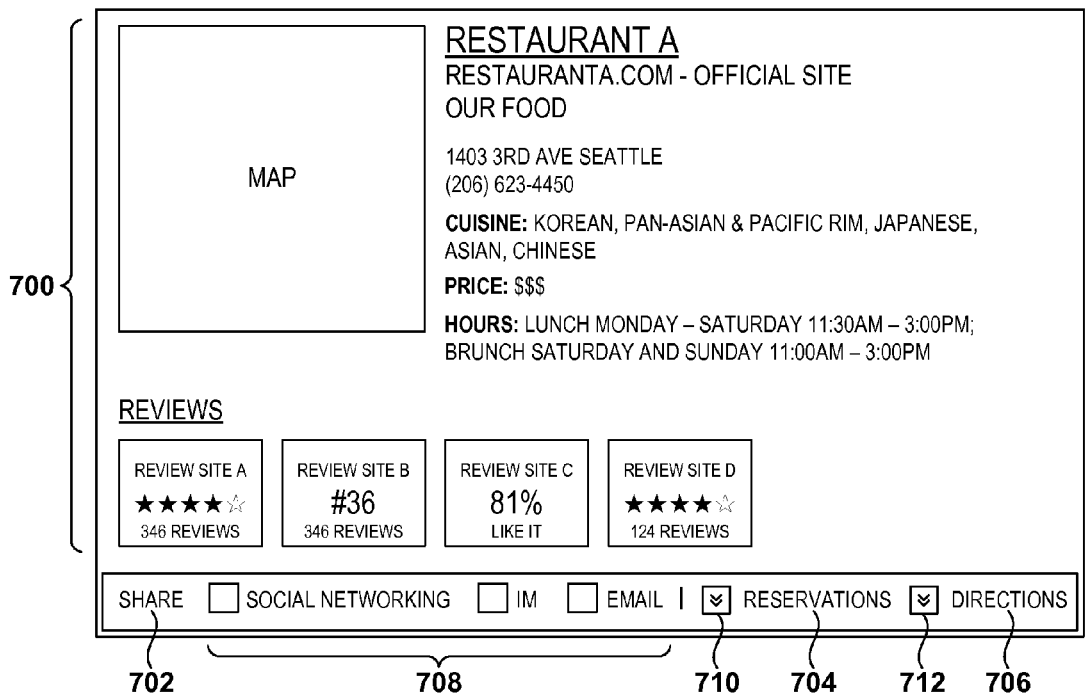
FIG. 7 is a schematic diagram depicting a third illustrative display of a search result item and corresponding actions and providers, in accordance with embodiments of the invention.

Turning now to FIG. 7, FIG. 7 illustrates another exemplary search result item 700 that corresponds with a particular entity (e.g., a restaurant) that may be presented on a search results page. Actions 702, 704, and 706 that correspond with the entity and/or the search result item are displayed in association with the search result item 700. A set of providers 708 are displayed near the corresponding action 702. For any number of reasons, providers are not initially displayed in association with actions 704 and 706. Such might be the case if those actions and/or providers are associated with a lower ranking or if too many providers exist for each of those actions 704 and 706. In any case, a "view providers" indicator 710 and 712 may be displayed in association with the respective actions 704 and 706 to provide an indication to a user that, upon selection of an indicator, one or more providers associated with the selected indicator can be displayed.

Figure 8:
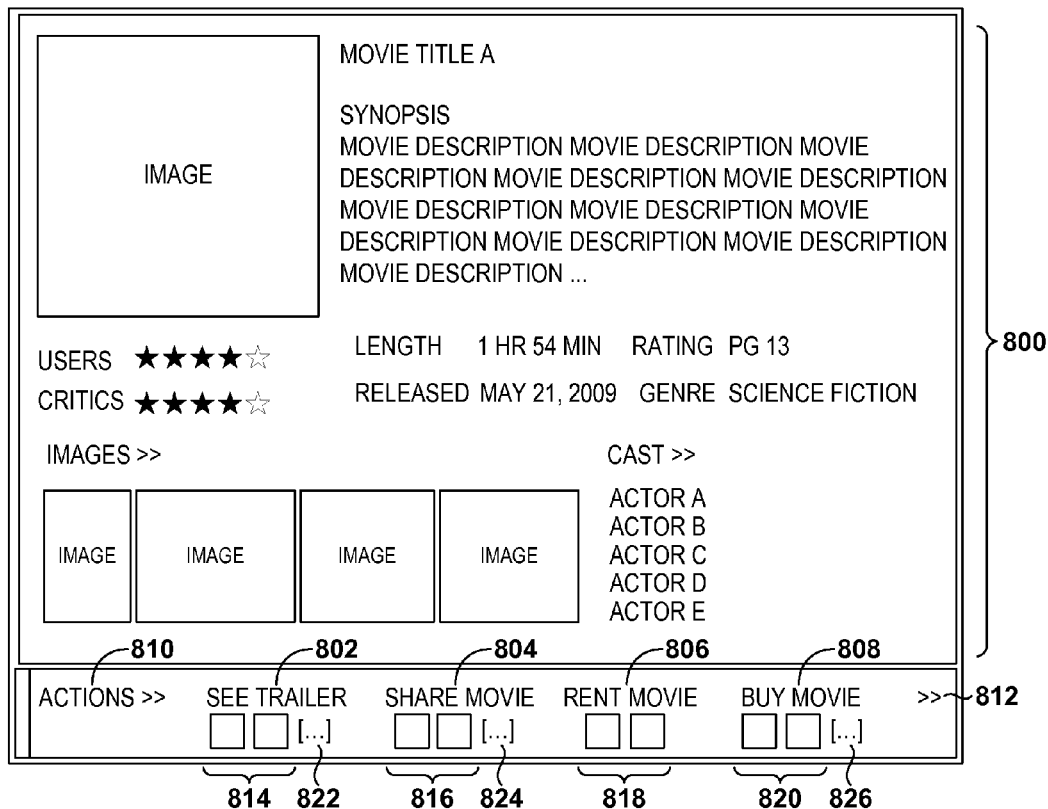
FIG. 8 is a schematic diagram depicting a fourth illustrative display of a search result item and corresponding actions and providers, in accordance with embodiments of the invention.

FIG. 8 illustrates another exemplary search result item 800 that corresponds with a particular entity (e.g., a movie) that may be presented on a search results page. Actions 802, 804, 806, and 808 that correspond with the entity and/or the search result item are displayed in association with the search result item 800. As can be appreciated, the actions 802, 804, 806, and 808 are identified using an action identifier 810. Further, a "more actions" indicator 812 can be displayed to provide an indication to a user that, upon selection of the indicator, one or more additional actions can be displayed. A set of providers 814 associated with action 802 is provided adjacent to action 802. A set of providers 816 associated with action 804 is provided adjacent to action 804. A set of providers 818 associated with action 806 is provided adjacent to action 806, and a set of providers 820 associated with action 808 is provided adjacent to action 808. As is illustrated, "more providers" indicators 822, 824, and 826 can be displayed to provide an indication to a user that, upon selection thereof, one or more additional providers can be displayed. More actions and/or more provider indicators can be represented in any manner, such as a text link, an arrow-shaped link, etc. Such indicators can provide a user an avenue for interacting with options not initially displayed. As previously discussed, providers and/or actions to be displayed may be based on, for example, query intent, online ranking, offline ranking, query logs, relevant search result items, etc.

Figure 9:
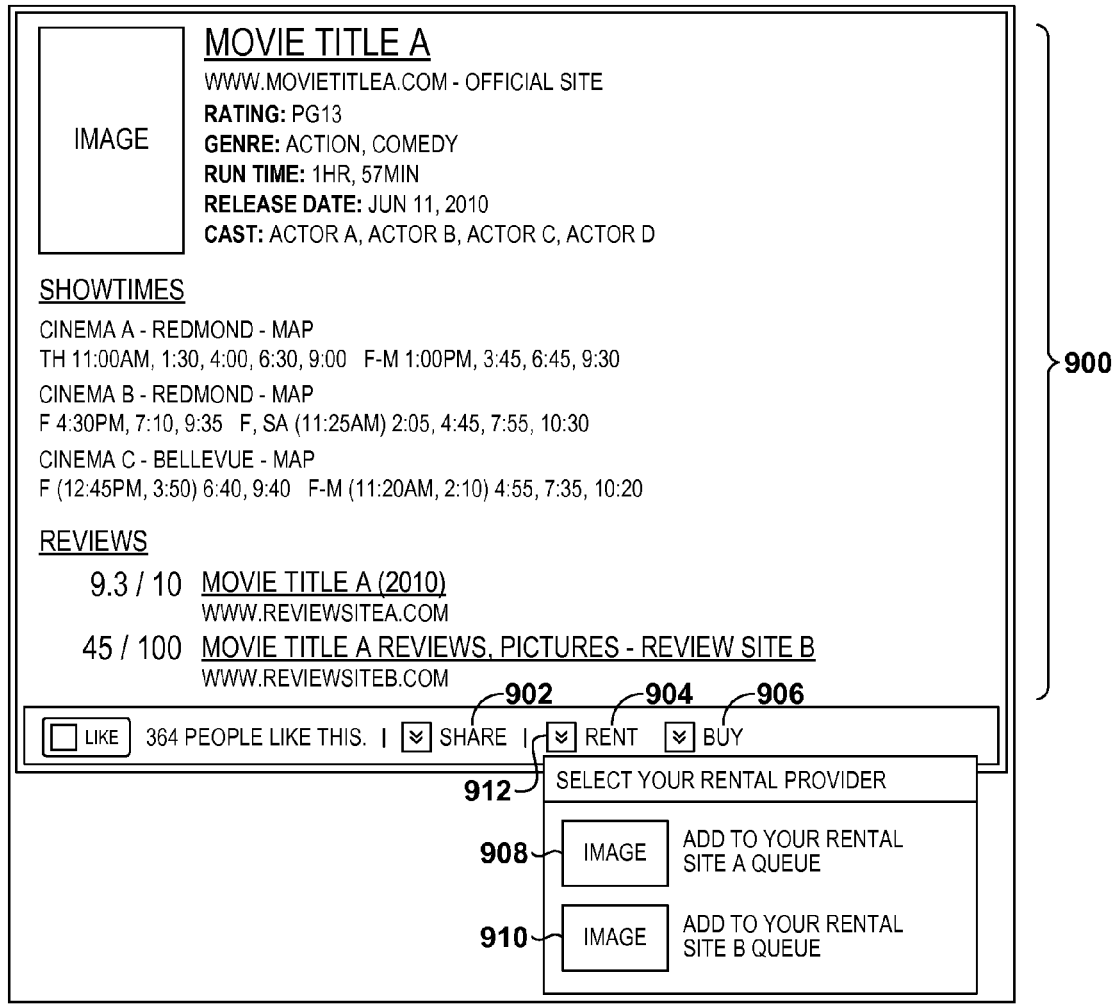
FIG. 9 is a schematic diagram depicting a fifth illustrative display of a search result item and corresponding actions and providers, in accordance with embodiments of the invention.

With reference to FIG. 9, another exemplary search result item 900 that corresponds with a particular entity (e.g., a movie) that might be presented on a search results page is provided. Actions 902, 904, and 906 corresponding with the entity and/or the search result item 900 are initially displayed in connection with the search result item 900. As illustrated in FIG. 9, additional details, such as providers 908 and 910, as well as other details (not shown), such as action parameters (e.g., show time selections, etc.) can be displayed vertically. For example, providers 908 and 910 may be displayed upon selection of a "view providers" indicator 912.

As can be appreciated, a user may interact with a display screen using well known input components, such as, for example, a mouse, joystick, stylus, touch screen, keyboard, or the like. In this regard, a user may select a provider associated with one of the actions to initiate execution of the corresponding action in association with the selected provider. For example, assume that a user selects provider 908. In such a case, the action of "renting" the "Movie Title A" via the selected provider 908 can be initiated. In this regard, another user interface element, such as user interface element 600 of FIG. 6, may be presented (e.g., within or overlaying the search results page) to complete the action, finalize the action, confirm the action, confirm completion of the action, obtain additional data for the action, etc. Accordingly, a user is not required to navigate away from the search results page to perform an action. Enabling an action to be executed within the context of the search results page can provide a consistent user interface experience for a user. In some embodiments, upon selecting a provider, the user may be linked to the third party for execution of the action. Similarly, a user may select an action to initiate execution thereof.

Figure 10:
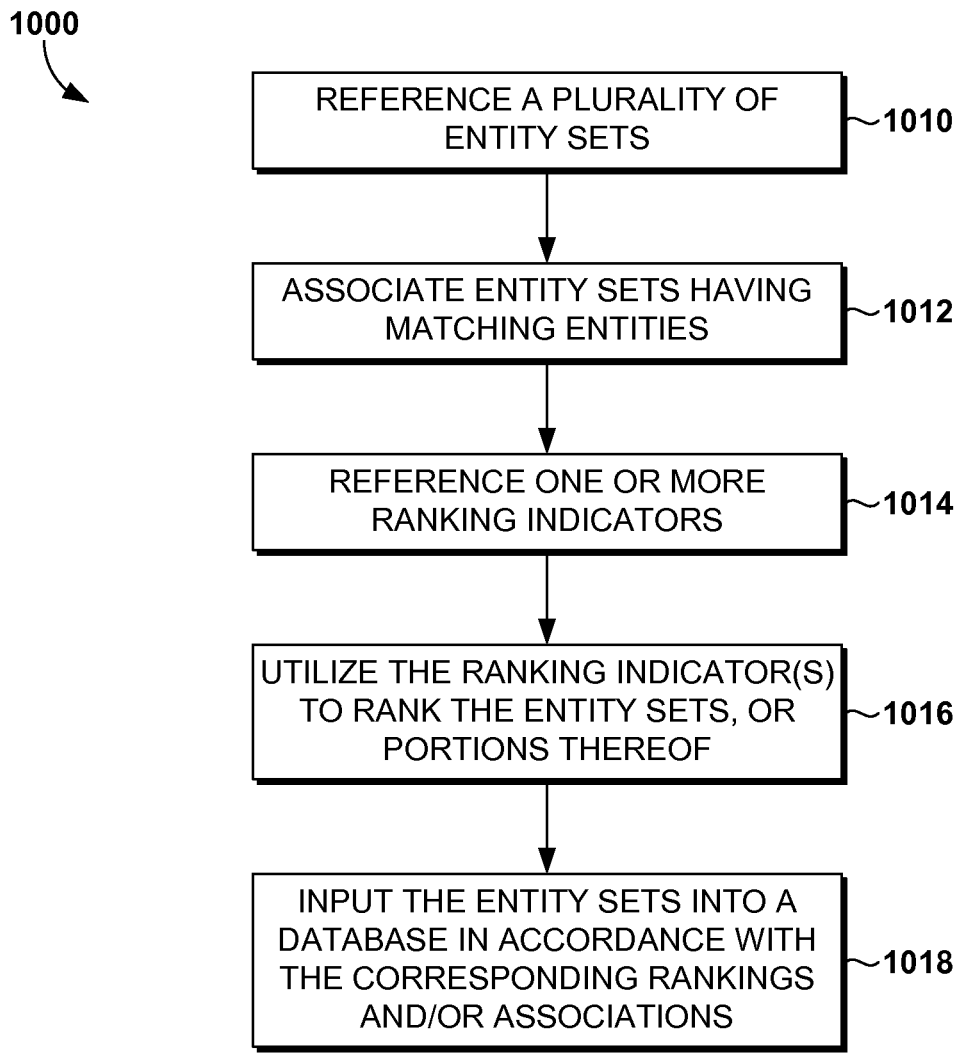
FIG. 10 is a flow diagram depicting an illustrative method for generating or modifying an entity-set database, according to embodiments of the invention.

To recapitulate, embodiments of the invention include systems, machines, media, methods, techniques, processes and options for providing relevant actions and/or providers associated with entities. Such actions and/or providers can be displayed in association with an entity representation, such as a search result item (e.g., search result or instant answer), on a search results page. Turning to FIG. 10, a flow diagram is illustrated that shows an exemplary method 1000 for generating or modifying an entity-set database, according to embodiments of the present invention. In some embodiments, aspects of embodiments of the illustrative method 1000 can be stored on computer-readable media as computer-executable instructions, which are executed by a processor in a computing device, thereby causing the computing device to implement aspects of the method 1000. The same is of course true with the illustrative methods 1100 and 1200 depicted in FIGS. 11 and 12, respectively, or any other embodiment, variation, or combination of these methods.

Initially, at block 1010, a plurality of entity sets are referenced. An entity set includes an entity, an action, and a provider. In some cases, an entity set may also include entity attributes that provide details regarding the entity, action, and/or provider. At block 1012, entity sets having matching (e.g., same or similar) entities are associated. In some cases, actions and/or providers may additionally or alternatively be matched. At block 1014, one or more ranking indicators are referenced. A ranking indicator may provide any indication of a ranking that should be associated with an entity set, entity, action, and/or provider. In embodiments, a ranking indicator is a query log(s), reputation analysis of link structure on the web, history of a user, log-in information associated with a user, or the like. Subsequently, at block 1016, the one or more ranking indicators (e.g., query logs) are utilized to rank the entity sets, or portions thereof (e.g., entities, actions, and/or providers). Such entity sets are input into, or updated within, a database in accordance with the corresponding ranking(s) and/or associations of entity sets. This is indicated at block 1018.

Figure 11:
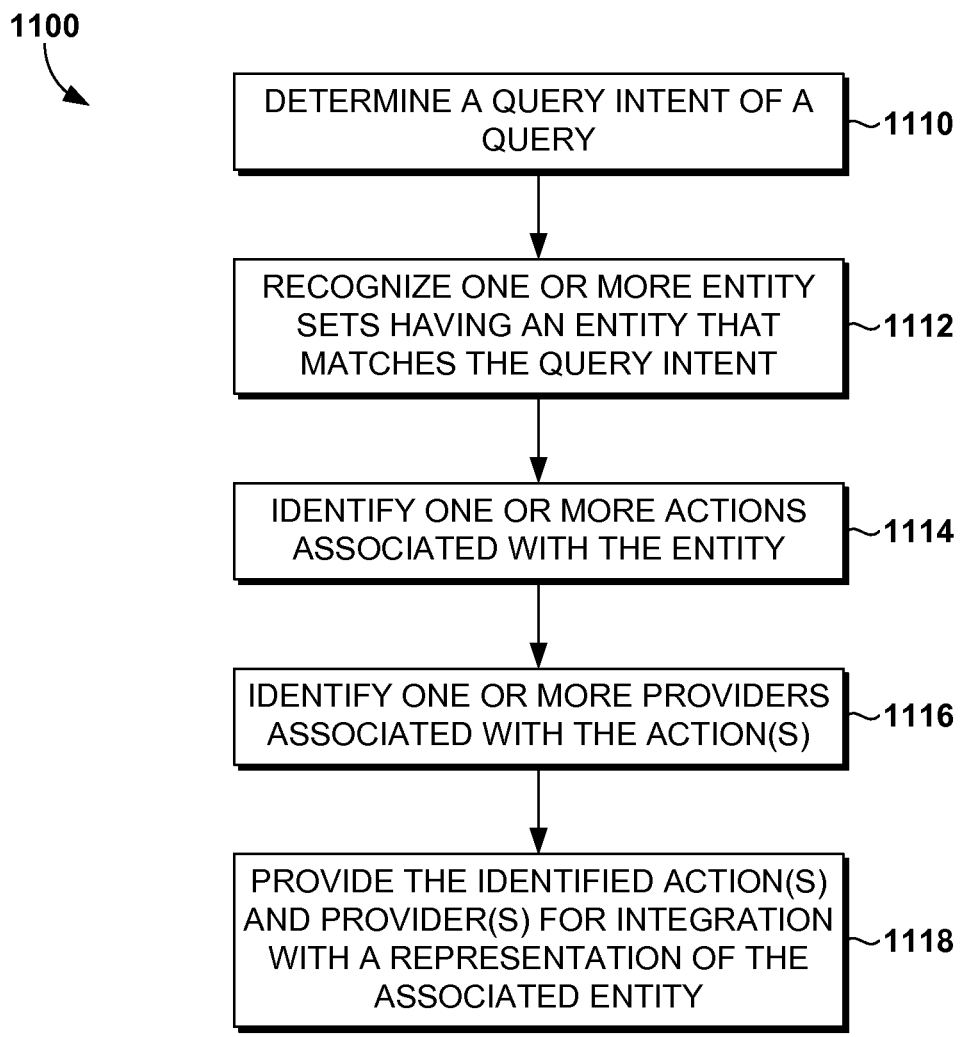
FIG. 11 is a flow diagram depicting an illustrative method of providing an action(s) and a provider(s) in association with an entity, in accordance with embodiments of the invention.

Turning now to FIG. 11, a flow chart depicts an illustrative method 1100 of providing an action(s) and provider(s) in association with an entity such that the action and/or provider can be displayed in connection with a representation of the entity. Initially, at block 1110, a query intent of a query received by a user is determined. Such a query may be input or selected by a user. At block 1112 one or more entity sets within a database having an entity that matches (e.g., same or similar) the determined query intent are recognized. An entity set includes an entity, an action, and a provider.

One or more actions associated with the entity that matches the determined query intent are identified. This is indicated at block 1114. In some embodiments, each action associated with the entity sets that have an entity matching query intent is identified. In alternative embodiments, a portion of the actions associated with the entity sets that have an entity matching query intent are identified. Identification of such a portion of actions may be based on, for example, an offline ranking (e.g., associated with an entity set, entity, or action), an online ranking (e.g., associated with an entity set, entity, or action), query intent, query logs, search result items identified in response to a search query, a combination thereof, or the like.

One or more providers associated with the identified one or more actions are identified, as indicated at block 1116. In some embodiments, each provider associated with the identified actions is identified. In alternative embodiments, a portion of the providers associated with the identified actions are identified. Identification of such a portion of providers may be based on, for example, an offline ranking (e.g., associated with an entity set, entity, or provider), an online ranking (e.g., associated with an entity set, entity, or provider), query intent, query logs, search result items identified in response to a search query, a combination thereof, or the like. The one or more actions and the corresponding one or more providers associated with the entity are provided for integration with a representation of the entity, such as a search result item that corresponds with the entity. This is indicated at block 1118.

Figure 12:
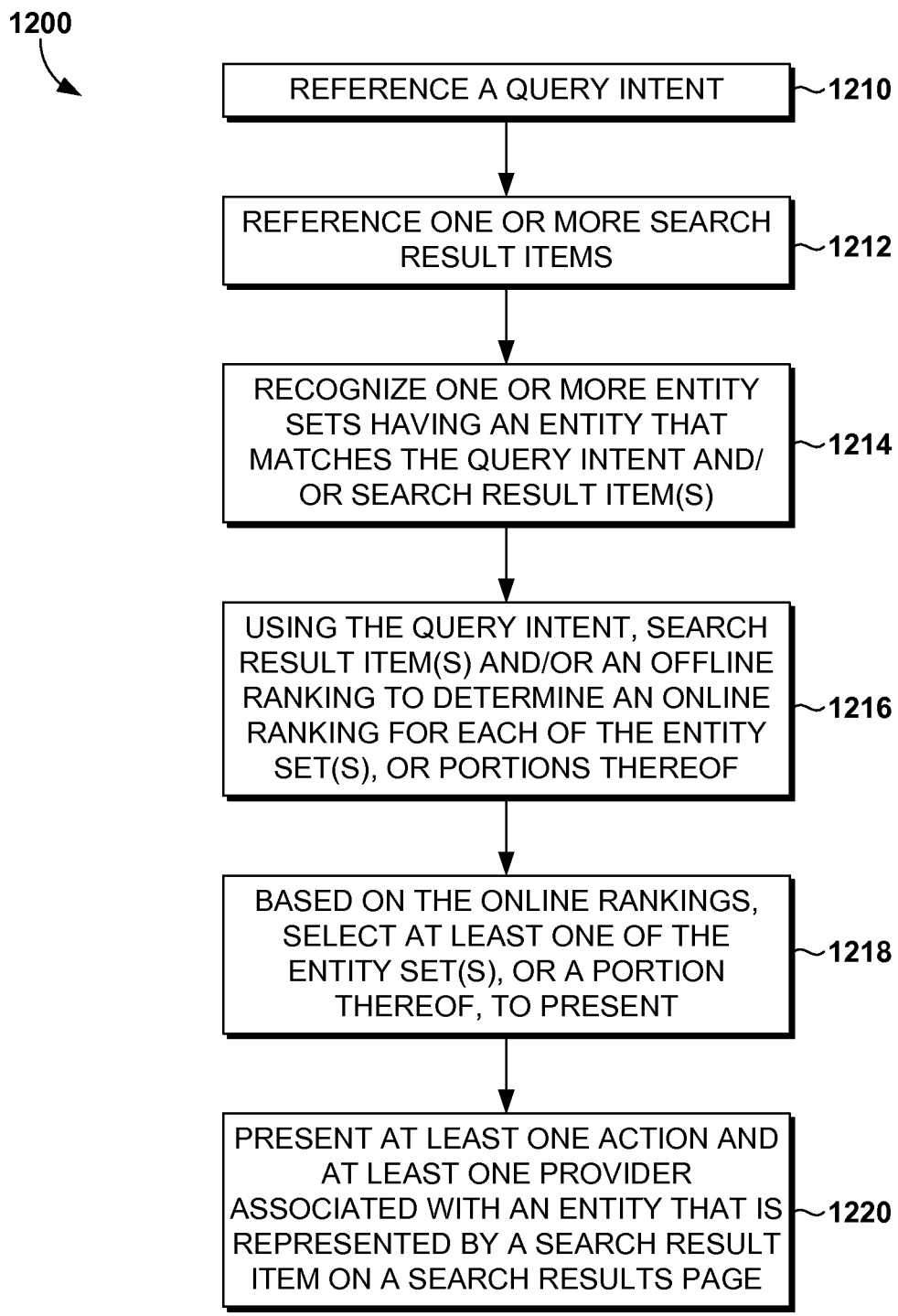
FIG. 12 is a flow diagram depicting another illustrative method of providing an action(s) and a provider(s) in association with an entity according to embodiments of the invention.

With reference to FIG. 12, another flow chart depicts an illustrative method 1200 of providing an action(s) and provider(s) in association with an entity such that the action and/or provider can be displayed in connection with a representation of the entity. With initial reference to block 1210, query intent is referenced. Query intent of a query may be determined upon receiving a query using query logs (e.g., in association with a user or group of users). At block 1212, one or more search result items are referenced. A search result item may be a search result or instant answer identified as relevant to a search query provided by a user. At block 1214, one or more entity sets having an entity that matches the query intent and/or the search result item(s) are recognized. Such entity sets may be stored within a database, and each entity set can include an entity, an action, and a provider.

The query intent, the search result item(s), and/or one or more offline rankings are used to determine an online ranking for each of the entity set(s), or portions thereof, as indicated at block 1216. In this regard, an online ranking can be determined for entity sets, entities, actions, and/or providers. Based on the online rankings, at least one of the entity sets, or portions thereof, are selected for presentation. This is indicated at block 1218. In some embodiments, all of the entity sets, or portions thereof, are selected for presentation. Alternatively, entity sets, or portions thereof, associated with a particular extent (e.g., rate, percent, number, etc.) of higher online rankings are selected for presentation. Subsequently, at block 1220, at least one action and at least one provider associated with an entity that is represented by a search result item on a search results page is presented. In some cases, a search result item that corresponds or correlates with the entity or entity set may be identified or recognized such that actions and/or providers can be displayed in association therewith.

Various embodiments of the invention have been described to be illustrative rather than restrictive. Alternative embodiments will become apparent from time to time without departing from the scope of embodiments of the inventions. It will be understood that certain features and sub-combinations are of utility and may be employed without reference to other features and sub-combinations. This is contemplated by and is within the scope of the claims.

The invention claimed is:

1. One or more computer hardware devices storing computer-executable instructions that, when executed by a processor in a computing device, cause the computing device to perform a method of facilitating presentation of actions and providers associated with entities, the method comprising:
   determining a query intent of a received query, using a query log of one or more users, wherein the query intent comprises at least a portion of the query;
   identifying a group of entity sets, from a plurality of stored entity sets, having a same first entity that matches the determined query intent, wherein each entity set includes an entity, an action corresponding with the entity, and a provider that implements the action on the entity;
   using the identified group of entity sets to identify a plurality of actions associated with the same first entity that matches the determined query intent, each of the plurality of actions representing a different function to perform;
   identifying one or more providers associated with each of the identified plurality of actions associated with the same first entity, each of the one or more providers implementing the associated action on the same first entity; and
   providing the plurality of actions and the corresponding one or more providers associated with the same first entity for concurrent integration with a representation of the associated first entity on a search results page including at least one search result having a content link configured for redirecting to a location associated with the at least one search result,
   wherein the first action is an action to be implemented on the first entity by the first provider and the second provider, and wherein the second action is an action to be implemented on the first action by the third provider and the fourth provider.

2. The one or more devices of claim 1, wherein the one or more actions are identified based on a ranking associated with the one or more actions or the entity sets in association therewith.

3. The one or more devices of claim 2, wherein the ranking comprises an offline ranking that utilizes one or more query logs to generate the ranking for each of the one or more actions.

4. The one or more devices of claim 2, wherein the ranking comprises an online ranking that utilizes one or more of the query intent, a search result item, or a user interest.

5. The one or more devices of claim 1, wherein the one or more providers are identified based on a ranking associated with the one or more providers or the entity sets in association therewith.

6. The one or more devices of claim 5, wherein the ranking comprises an offline ranking that is determined utilizing one or more query logs to generate the ranking for each of the one or more providers or an online ranking that is determined utilizing one or more of the query intent, a search result item, a user interest, or the offline ranking to generate the ranking for each of the one or more providers.

7. The one or more devices of claim 1 further comprising selecting the search result item with which to present the one or more providers and the one or more actions.

8. The one or more devices of claim 1, wherein the method further comprises providing a selectable more actions indicator that, if selected, presents additional actions.

9. The one or more devices of claim 1, wherein the method further comprises providing a selectable more providers indicator that, if selected, presents additional providers.

10. The one or more devices of claim 1, wherein selection of one of the providers corresponding with one of the actions initiates execution of the corresponding action in association with the selected provider.

11. The one or more devices of claim 1, wherein the method further comprises displaying additional details associated with one of the providers upon a user indication associated with a particular one of the providers.

12. The one or more devices of claim 1, wherein each of the plurality of actions representing a different transaction to perform against the same first entity.

13. A method of facilitating presentation of actions and providers associated with entities, the method comprising:

determining a query intent of a received query, using a query log of one or more users, wherein the query intent comprises at least a portion of the query;

identifying a plurality of entity sets, from among a group of entity sets, having a first entity that matches the determined query intent, wherein the group of entity sets are ranked before receiving the received query, and wherein each of the plurality of entity sets includes an entity, an action corresponding with the entity and that represents a function to perform, and a provider that executes the corresponding action;

identifying a first action associated with the first entity within the plurality of entity sets that matches the determined query intent and a second action associated with the first entity that is different from the first action;

identifying a first provider and a second provider associated with the first action for the first entity and a third provider and a fourth provider associated with the second action for the first entity; and providing each of the first action and the corresponding first provider and second provider and the second action and the corresponding third provider and fourth provider for simultaneous presentation with at least one search result a representation of the associated first entity on a search results page such that each of (i) the first entity, (ii) the first action and the corresponding first provider and second provider, and (iii) the second action and the corresponding third provider and fourth provider are simultaneously displayed in the search results page, wherein the first action is an action to be implemented on the first entity by the first provider and the second provider, and wherein the second action is an action to be implemented on the first action by the third provider and the fourth provider.

14. The method of 13, further comprising providing a selectable more actions indicator that, if selected, presents additional actions.

15. The method of 13, further comprising providing a selectable more providers indicator that, if selected, presents additional providers.

16. The method of 13, wherein selection of one of the providers corresponding with one of the actions initiates execution of the corresponding action in association with the selected provider.

17. The method of 13, further comprising displaying additional details associated with one of the providers upon a user indication associated with a particular one of the providers.

18. A system for facilitating presentation of actions and providers associated with entities, the system comprising:

one or more processors;

one or more computer storage media storing computer-useable instructions that, when used by the one or more processors, cause the one or more processors to:

determine a query intent of a received query, using a query log of one or more users, wherein the query intent comprises at least a portion of the query;

identify a group of entity sets, from a plurality of stored entity sets, having a same first entity that matches the determined query intent, wherein each entity set includes an entity, an action corresponding with the entity, and a provider, and wherein the plurality of stored entity sets are ranked prior to receiving the received query;

use the identified group of entity sets to identify a plurality of actions associated with the same first entity that matches the determined query intent;

identify one or more providers associated with each of the identified plurality of actions associated with the same first entity; and provide the plurality of actions and the corresponding one or more providers associated with the same first entity for concurrent integration with a representation of the associated first entity on a search results page where the search result page includes each of the (i) representation of the first entity, (ii) the plurality of actions associated with the same first entity, and (iii) the corresponding one or more providers associated with the same first entity, wherein the plurality of actions are actions to be implemented by the corresponding one or more providers associated with the same first entity.

\* \* \* \* \*